United States Patent
Kim et al.

(10) Patent No.: US 9,499,400 B2
(45) Date of Patent: Nov. 22, 2016

(54) OPTICAL DEVICES AND METHODS OF CONTROLLING PROPAGATION DIRECTIONS OF LIGHT FROM THE OPTICAL DEVICES

(75) Inventors: Jin-eun Kim, Suwon-si (KR); Q-han Park, Seoul (KR); Chang-won Lee, Seoul (KR); Yeon-sang Park, Seoul (KR); Young-geun Roh, Seoul (KR); Hwan-soo Suh, Gunpo-si (KR); Jong-ho Choe, Seoul (KR)

(73) Assignees: Samsung Electronics Co., Ltd., Gyeonggi-do (KR); Korea Universisty Industrial & Academic Collaboration Foundation, Seoul (KR)

( * ) Notice: Subject to any disclaimer, the term of this patent is extended or adjusted under 35 U.S.C. 154(b) by 1035 days.

(21) Appl. No.: 13/549,808

(22) Filed: Jul. 16, 2012

(65) Prior Publication Data
US 2013/0070459 A1 Mar. 21, 2013

(30) Foreign Application Priority Data
Sep. 16, 2011 (KR) .................. 10-2011-0093642

(51) Int. Cl.
*G02B 26/08* (2006.01)
*G02F 1/29* (2006.01)
*B82Y 20/00* (2011.01)

(52) U.S. Cl.
CPC ........... *B82Y 20/00* (2013.01); *Y10T 29/49826* (2015.01)

(58) Field of Classification Search
CPC .. G01N 21/553; G01N 21/554; B82Y 20/00; B82Y 15/00; B82Y 30/00; B82Y 40/00; B82Y 35/00; G02B 5/008; G02B 6/1226; G02B 2006/12107

USPC .................. 257/E29.322, 264; 356/445–448; 359/298–320; 977/776, 856, 861, 878, 977/937
See application file for complete search history.

(56) References Cited

U.S. PATENT DOCUMENTS

2008/0070010 A1 3/2008 Dravid et al.
2009/0188544 A1* 7/2009 Kobayashi et al. .......... 136/244
(Continued)

FOREIGN PATENT DOCUMENTS

KR 20060130543 A 12/2006
KR 20070012631 A 1/2007
(Continued)

OTHER PUBLICATIONS

Curto, Alberto G., et al. "Unidirectional Emission of a Quantum Dot Coupled to a Nanoantenna" Science vol. 329, 930 (2010).
(Continued)

*Primary Examiner* — Mahidere Sahle
(74) *Attorney, Agent, or Firm* — Harness, Dickey & Pierce, P.L.C.

(57) ABSTRACT

An optical device may include a substrate, a metal layer on the substrate, at least one first nano-structure in the layer, and at least one second nano-structure in the layer. The at least one first nano-structure may include a light source. The at least one first and second nano-structures may be spaced apart. A method of controlling a propagation direction of light output from an optical device that includes a metal layer on a substrate may include disposing first and second nano-structures in the layer; disposing at least one light source in the first nano-structure; and controlling the propagation direction of the light output from the at least one light source by changing at least one of a shape of the first nano-structure, a shape of the second nano-structure, a size of the first nano-structure, a size of the second nano-structure, and an interval between the first and second nano-structures.

45 Claims, 8 Drawing Sheets

(56) References Cited

U.S. PATENT DOCUMENTS

2009/0250102 A1 10/2009 Kim et al.
2010/0097611 A1 4/2010 Song
2011/0301066 A1* 12/2011 Blair .............................. 506/33

FOREIGN PATENT DOCUMENTS

KR 2009-0105482 A 10/2009
KR 20100090077 A 8/2010

OTHER PUBLICATIONS

Kyung-Sang Cho, et al., "High-performance crosslinked colloidal quantum-dot light-emitting diodes", Nature Photonics, vol. 3, Jun. 2009, pp. 341-345.
Suresh Donthu, et al., "Facile Scheme for Fabricating Solid-State Nanostructures Using E-Beam Lithography and Solution Precursors", Nano Letters, 2005, vol. 5, No. 9, pp. 1710-1715.

* cited by examiner

OPTICAL DEVICES AND METHODS OF CONTROLLING PROPAGATION DIRECTIONS OF LIGHT FROM THE OPTICAL DEVICES

CROSS-REFERENCE TO RELATED APPLICATION(S)

This application claims priority from Korean Patent Application No. 10-2011-0093642, filed on Sep. 16, 2011, in the Korean Intellectual Property Office (KIPO), the entire contents of which are incorporated herein by reference.

BACKGROUND

1. Field

Example embodiments relate to optical devices and/or methods of controlling propagation direction of light from optical devices.

2. Description of Related Art

Many optical devices, which use light, have recently been developed. Since optical devices use light, optical devices have an advantage of high-speed operation. However, while electrical devices have been miniaturized to have sizes of several tens to several hundreds of nanometers, it is difficult for optical devices to have sizes equal to or less than wavelengths of incident light due to a diffraction limit of light, and thus it difficult to reduce sizes of optical devices to several micrometers (μm) or less. Accordingly, there is a limitation in manufacturing an integrated optical circuit including an optical device.

SUMMARY

Example embodiments may provide optical devices and/or methods of controlling propagation directions of light from optical devices.

Additional aspects may be set forth in part in the description which follows and, in part, may be apparent from the description, and/or may be learned by practice of example embodiments.

According to example embodiments, an optical device may comprise a substrate, a metal layer on the substrate, at least one first nano-structure in the metal layer, and/or at least one second nano-structure in the metal layer. The at least one first nano-structure may include a light source. The at least one second nano-structure may be spaced apart from the at least one first nano-structure.

According to example embodiments, the at least one first nano-structure may be carved into the metal layer.

According to example embodiments, the at least one second nano-structure may be carved into the metal layer.

According to example embodiments, the at least one first nano-structure may have a hexahedral shape.

According to example embodiments, the at least one second nano-structure may have a hexahedral shape.

According to example embodiments, the optical device may be an optical antenna.

According to example embodiments, the at least one first nano-structure may have a hexahedral shape having a depth, a short width, and a long width, and/or a resonance wavelength of the light source may be adjusted by changing at least one of the depth, the short width, and the long width.

According to example embodiments, the at least one first nano-structure may have a hexahedral shape having a first depth, a first short width, and a first long width, and/or a propagation direction of light output from the light source may be adjusted by changing at least one of an interval between the at least one first nano-structure and the at least one second nano-structure, and the first long width.

According to example embodiments, the at least one second nano-structure may have a hexahedral shape having a second depth, a second short width, and a second long width, and/or a propagation direction of light output from the light source may be adjusted by changing at least one of an interval between the at least one first nano-structure and the at least one second nano-structure, and the second long width.

According to example embodiments, the at least one first nano-structure may have a hexahedral shape having a first depth, a first short width, and a first long width; the at least one second nano-structure may have a hexahedral shape having a second depth, a second short width, and a second long width; and/or a propagation direction of light output from the light source may be adjusted by changing at least one of an interval between the at least one first nano-structure and the at least one second nano-structure, the first long width, and the second long width.

According to example embodiments, the at least one first nano-structure may have a slot shape.

According to example embodiments, the at least one second nano-structure may have a slot shape.

According to example embodiments, the light source may comprise at least one of a point light source, a line light source, and a surface light source.

According to example embodiments, the light source may comprise at least one of quantum dots, dye molecules, and a laser.

According to example embodiments, a surface plasmon may be generated on the metal layer.

According to example embodiments, the at least one first nano-structure may have a size less than a wavelength of light output from the light source.

According to example embodiments, the at least one second nano-structure may have a size less than a wavelength of light output from the light source.

According to example embodiments, an optical device may comprise a substrate, a metal layer on the substrate, a first nano-structure in the metal layer, and/or a second nano-structure in the metal layer. The first nano-structure may include a light source. The second nano-structure may be spaced apart from the first nano-structure. The first nano-structure may have a hexahedral shape having a first depth, a first short width, and a first long width. The second nano-structure may have a hexahedral shape having a second depth, a second short width, and a second long width.

According to example embodiments, the first depth and the second depth may be the same and/or the second long width may be less than the first long width.

According to example embodiments, when the second long width is greater than the first long width, light output from the light source may propagate toward the second nano-structure.

According to example embodiments, when the second long width is less than the first long width, light output from the light source may propagate away from the second nano-structure.

According to example embodiments, an optical device may further comprise a third nano-structure in the metal layer. The third nano-structure may be spaced apart from the first and second nano-structures. The third nano-structure may be disposed at a side of the first nano-structure opposite to the second nano-structure.

According to example embodiments, the third nano-structure may have a hexahedral shape having a third depth, a third short width, and a third long width.

According to example embodiments, an interval between the first nano-structure and the second nano-structure and an interval between the first nano-structure and the third nano-structure may be the same, the first long width and the second long width may be the same, and/or the third long width may be greater than the first long width.

According to example embodiments, an interval between the first nano-structure and the second nano-structure and an interval between the first nano-structure and the third nano-structure may be the same, the second long width may be less than the first long width, the third long width may be greater than the first long width, and/or the third long width may be greater than the second long width.

According to example embodiments, an interval between the first nano-structure and the second nano-structure and an interval between the first nano-structure and the third nano-structure may be the same, and/or the first long width, the second long width, and the third long width may be the same.

According to example embodiments, each of the first depth, the second depth, the third depth, the first short width, the second short width, the third short width, the first long width, the second long width, and the third long width may be less than a wavelength of light output from the light source.

According to example embodiments, an optical device may further comprise a fourth nano-structure in the metal layer and/or a fifth nano-structure in the metal layer. The fourth nano-structure may be spaced apart from the first, second, and third nano-structures. The fifth nano-structure may be spaced apart from the first, second, third, and fourth nano-structures.

According to example embodiments, the fourth nano-structure may be disposed at a side of the second nano-structure opposite to the first nano-structure.

According to example embodiments, the fifth nano-structure may be disposed at a side of the third nano-structure opposite to the first nano-structure.

According to example embodiments, the first nano-structure may have a slot shape.

According to example embodiments, the second nano-structure may have a slot shape.

According to example embodiments, a surface plasmon may be generated on the metal layer.

According to example embodiments, a method of controlling a propagation direction of light output from an optical device comprising a metal layer on a substrate may comprise disposing a first nano-structure and a second nano-structure in the metal layer, spaced apart from each other; disposing at least one light source in the first nano-structure; and/or controlling the propagation direction of the light output from the at least one light source by changing at least one of a shape of the first nano-structure, a shape of the second nano-structure, a size of the first nano-structure, a size of the second nano-structure, and an interval between the first nano-structure and the second nano-structure.

According to example embodiments, the first nano-structure may have a slot shape and/or a wavelength of the light output from the at least one light source may be adjusted by changing at least one of a depth and a width of the slot shape.

According to example embodiments, when the first nano-structure has a hexahedral shape having a first depth, a first short width, and a first long width, and the second nano-structure has a hexahedral shape having a second depth, a second short width, and a second long width, controlling the propagation direction of the light output from the at least one light source may comprise changing at least one of the interval between the first nano-structure and the second nano-structure, the first depth, the first short width, the first long width, the second depth, the second short width, and the second long width.

According to example embodiments, when the first nano-structure has a hexahedral shape having a first depth, a first short width, and a first long width, and the second nano-structure has a hexahedral shape having a second depth, a second short width, and a second long width, controlling the propagation direction of the light output from the at least one light source may comprise changing at least one of the first long width and the second long width.

According to example embodiments, when the first nano-structure has a hexahedral shape having a first depth, a first short width, and a first long width, and the second nano-structure has a hexahedral shape having a second depth, a second short width, and a second long width, controlling the propagation direction of the light output from the at least one light source may comprises maintaining constant the interval between the first nano-structure and the second nano-structure, the first depth, the first short width, the second depth, and the second short width, and/or changing at least one of the first long width and the second long width.

According to example embodiments, when the first nano-structure has a hexahedral shape having a first depth, a first short width, and a first long width, and the second nano-structure has a hexahedral shape having a second depth, a second short width, and a second long width, controlling the propagation direction of the light output from the at least one light source may comprise changing the interval between the first nano-structure and the second nano-structure.

According to example embodiments, when the first nano-structure has a hexahedral shape having a first depth, a first short width, and a first long width, and the second nano-structure has a hexahedral shape having a second depth, a second short width, and a second long width, controlling the propagation direction of the light output from the at least one light source may comprise maintaining constant the first depth, the first short width, the first long width, the second depth, the second short width, and the second long width, and/or changing the interval between the first nano-structure and the second nano-structure.

According to example embodiments, the method may further comprise disposing a third nano-structure in the metal layer. The third nano-structure may be spaced apart from the first and second nano-structures, the third nano-structure may be disposed at a side of the first nano-structure opposite to the second nano-structure, the first nano-structure may have a hexahedral shape having a first depth, a first short width, and a first long width, the second nano-structure may have a hexahedral shape having a second depth, a second short width, and a second long width, and/or the third nano-structure may have a hexahedral shape having a third depth, a third short width, and a third long width.

According to example embodiments, controlling the propagation direction of the light output from the at least one light source may comprise changing at least one of the interval between the first nano-structure and the second nano-structure, an interval between the first nano-structure and the third nano-structure, the first depth, the first short width, the first long width, the second depth, the second short width, the second long width, the third depth, the third short width, and the third long width.

According to example embodiments, controlling the propagation direction of the light output from the at least one light source may comprise, when the interval between the first nano-structure and the second nano-structure and an interval between the first nano-structure and the third nano-structure are the same, the first depth, the second depth, and the third depth are the same, and the first short width, the second short width, and the third short width are the same, changing at least one of the first long width, the second long width, and the third long width.

According to example embodiments, a surface plasmon may be generated on the metal layer, and/or a propagation direction of the surface plasmon may be controlled by using the first nano-structure and the second nano-structure.

According to example embodiments, the at least one light source may comprise at least one of quantum dots, dye molecules, and a laser.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
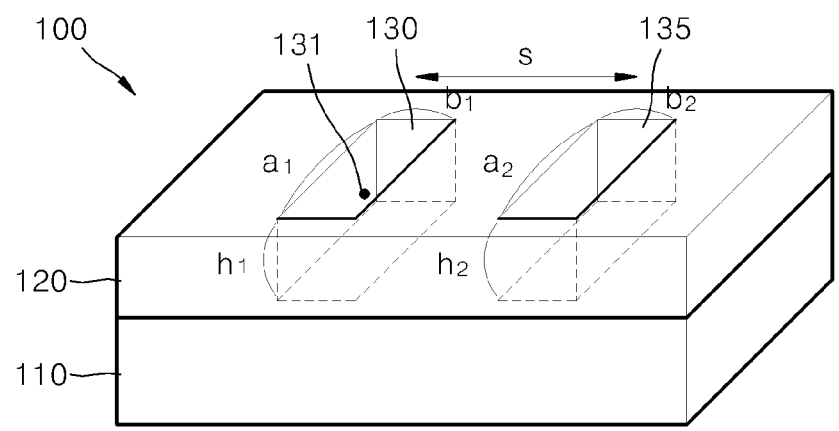
FIG. 1 is a perspective view illustrating an optical device according to example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a perspective view illustrating an optical device 100 according to example embodiments. The optical device 100 includes a substrate 110, a metal layer 120 disposed on the substrate 110, and at least one nano-structure disposed in the metal layer 120. The metal layer 120 may be coated on the substrate 110, and the at least one nano-structure may be patterned in the metal layer 120. The at least one nano-structure may be carved into the metal layer 120. The at least one nano-structure may have, for example, a slot shape. In FIG. 1, a propagation direction of light output from a light source may be adjusted according to a size, a shape, an interval, and so on of the at least one nano-structure.

The at least one nano-structure may include at least one first nano-structure including, for example, a light source, and at least one second nano-structure disposed to be spaced apart from the first nano-structure. For example, as shown in FIG. 1, the at least one nano-structure may include a first nano-structure 130 including a light source 131, and a second nano-structure 135 disposed to be spaced apart from the first nano-structure 130. Any of various light sources may be used as the light source 131, and the light source 131 may include at least one of a point light source, a line light source, and a surface light source. The light source 131 may include at least one of, for example, quantum dots, dye molecules, and a laser. The light source 131 may include a light source that emits light by itself, or a light source that uses external light. The first nano-structure 130 including the light source 131 may operate as a feeder of the optical device 100. For example, a resonance wavelength of light output from the light source 131 may be adjusted by adjusting at least one of, for example, a size and a shape of the first nano-structure 130. The second nano-structure 135 may operate as, for example, a director for guiding light output from the light source 131 or a reflector for reflecting light output from the light source 131. For example, a propagation direction of light may be controlled by adjusting at least one of, for example, a size of the second nano-structure 135, a shape of the second nano-structure 135, and an interval s between the first nano-structure 130 and the second nano-structure 135.

Each of the first nano-structure 130 and the second nano-structure 135 may have, for example, a hexahedral shape. The first nano-structure 130 may have a hexahedral shape having a first depth h1, a first long width a1, and a first short width b1. The second nano-structure 135 may have a hexahedral shape having a second depth h2, a second long width a2, and a second short width b2. For example, a propagation direction of light output from the light source 131 may be adjusted by changing at least one of the first depth h1, the first long width a1, the first short width b1, the second depth h2, the second long width a2, the second short width b2, and an interval s between the first nano-structure 130 and the second nano-structure 135.

Meanwhile, the metal layer 120 may generate a surface plasmon on a surface of the metal layer 120 due to light incident from the outside. If each of the first nano-structure 130 and the second nano-structure 135 is carved into the metal layer 120, a surface plasmon generated on the metal layer 120 may induce coupling between the first nano-structure 130 and the second nano-structure 135 and thus light may be obtained. Accordingly, the optical device 100 of FIG. 1 may transmit light output from the light source 131, and may transmit a surface plasmon generated on the metal layer 120. As such, the optical device 100 of FIG. 1 may operate as, for example, a nano-antenna. Also, in the optical device 100 of FIG. 1, a surface plasmon is generated due to light, and the first nano-structure 130 and the second nano-structure may adjust a propagation direction of the surface plasmon. A wavelength of a surface plasmon generated may be less than a wavelength of light output from the light source 131.

Figure 2:
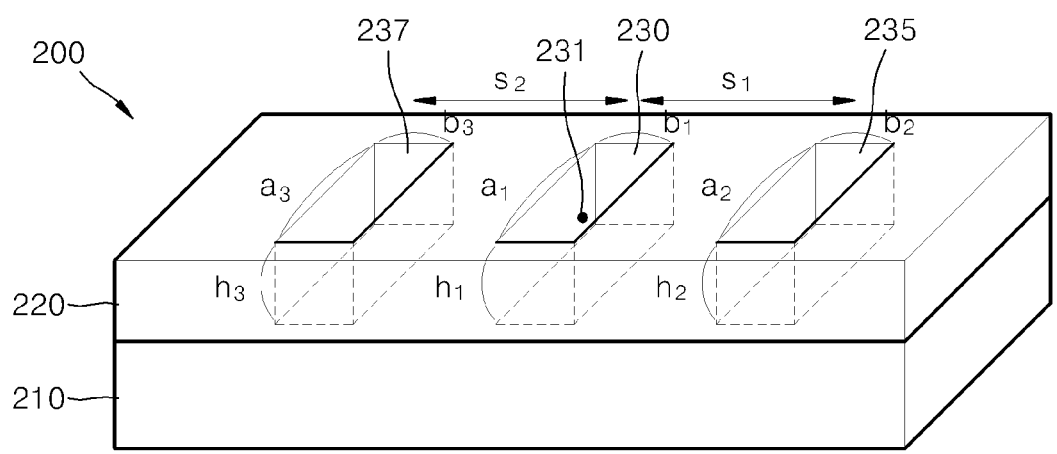
FIG. 2 is a perspective view illustrating an optical device according to example embodiments.

FIG. 2 is a perspective view illustrating an optical device 200 according to example embodiments. The optical device 200 includes a substrate 210, a metal layer 220 disposed on the substrate 210, and first, second, and third nano-structures 230, 235, and 237 disposed in the metal layer 220. The first nano-structure 230 may include a light source 231, the second nano-structure 235 may be disposed at a side of the first nano-structure 230 to be spaced apart from the first nano-structure 230, and the third nano-structure 237 may be disposed at another side of the first nano-structure 230 to be spaced apart from the first nano-structure 230. Each of the first, second, and third nano-structures 230, 235, and 237 may be carved into the metal layer 220.

The light source 231 may include at least one of, for example, quantum dots, dye molecules, and a laser. The first nano-structure 230 including the light source 231 may operate as a feeder of the optical device 200. For example, a resonance wavelength of light output from the light source 231 may be adjusted by adjusting at least one of, for example, a size and a shape of the first nano-structure 230. The second nano-structure 235 and the third nano-structure 237 may operate as, for example, a director for guiding light output from the light source 231 or a reflector for reflecting light output from the light source 231. For example, a propagation direction of light may be controlled by adjusting at least one of a size of any of the second nano-structure 235 and the third nano-structure 237, a shape of any of the second nano-structure 235 and the third nano-structure 237, an interval s1 between the first nano-structure 230 and the second nano-structure 235, and an interval s2 between the first nano-structure 230 and the third nano-structure 237.

Each of the first nano-structure 230, the second nano-structure 235, and the third nano-structure 237 may have, for example, a hexahedral shape. The first nano-structure 230 may have a hexahedral shape having a first depth h1, a first long width a1, and a first short width b1. The second nano-structure 235 may have a hexahedral shape having a second depth h2, a second long width a2, and a second short width b2. The third nano-structure 237 may have a hexahedral shape having a third depth h3, a third long width a3, and a third short width b3. For example, a propagation direction of light output from the light source 231 may be adjusted by changing at least one of the first depth h1, the first long width a1, the first short width b1, the second depth h2, the second long width a2, the second short width b2, the third depth h3, the third long width a3, the third short width b3, the interval s1 between the first nano-structure 230 and the second nano-structure 235, and the interval s2 between the first nano-structure 230 and the third nano-structure 237.

Meanwhile, the metal layer 220 may generate a surface plasmon on a surface of the metal layer 220 due to light incident from the outside. If each of the first nano-structure 230, the second nano-structure 235, and the third nano-structure 237 is carved into the metal layer 220, a surface plasmon generated on the metal layer 220 may induce coupling among the first nano-structure 230, the second nano-structure 235, and the third nano-structure 237, and thus light may be obtained, and a propagation direction of the surface plasmon may be controlled. Accordingly, the optical device 200 of FIG. 2 may transmit light output from the light source 231, and may transmit a surface plasmon generated on the metal layer 220.

Operations of optical devices according to example embodiments will now be explained.

Figure 3:
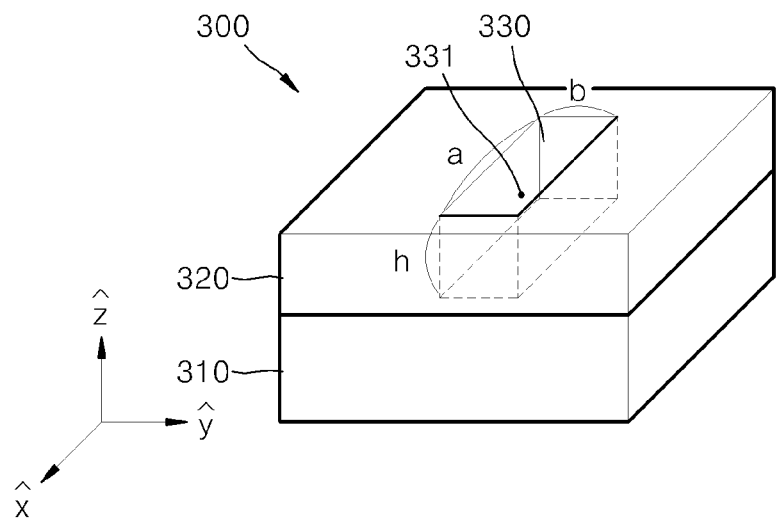
FIG. 3 is a perspective view illustrating a nano-structure including a light source.

FIG. 3 is a perspective view for explaining an operation of an optical device 300 that includes nano-structure 330 and light source 331. A metal layer 320 is formed on a substrate 310, and the nano-structure 330 is formed in the metal layer 320. The nano-structure 330 may be formed having a hexahedral slot shape having, for example, a long width a, a short width b, and a depth h. The substrate 310 may be formed of, for example, Al$_2$O$_3$, and the nano-structure 330 may be formed such that the long width a is 150 nm and the short width b is 20 nm.

Figure 4:
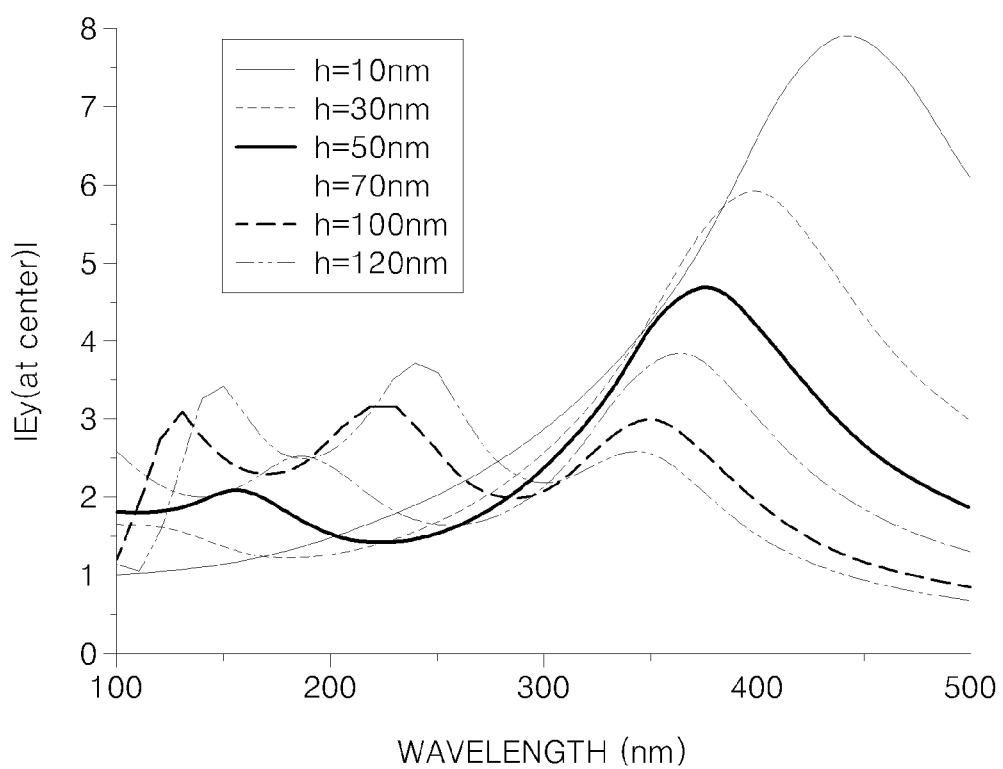
FIG. 4 is a graph illustrating a relationship between a wavelength and an intensity of an electric field when a depth of the nano-structure of FIG. 3 is changed.

FIG. 4 is a graph illustrating a relationship between a wavelength and an intensity Ey of an electric field when the depth h of the nano-structure 330 of FIG. 3 is changed. The intensity Ey of the electric field is an intensity in a y direction at a central portion of the nano-structure 330.

Referring to FIG. 4, since light is more affected by the substrate 310 as the depth h of the nano-structure 330 decreases, a resonance peak may move toward a long wavelength. Since light is less affected by the substrate 310 as the depth h of the nano-structure 330 increases, a resonance peak located in a right portion of the graph moves to the left, and due to a Fabry-Perot effect that varies according to the depth h of the nano-structure 330, a new resonance peak may occur in a left portion of the graph. As the depth h of the nano-structure 330 increases, a number of resonance peaks due to the Fabry-Parot effect may increase and the resonance peaks may move toward a short wavelength.

Figure 5:
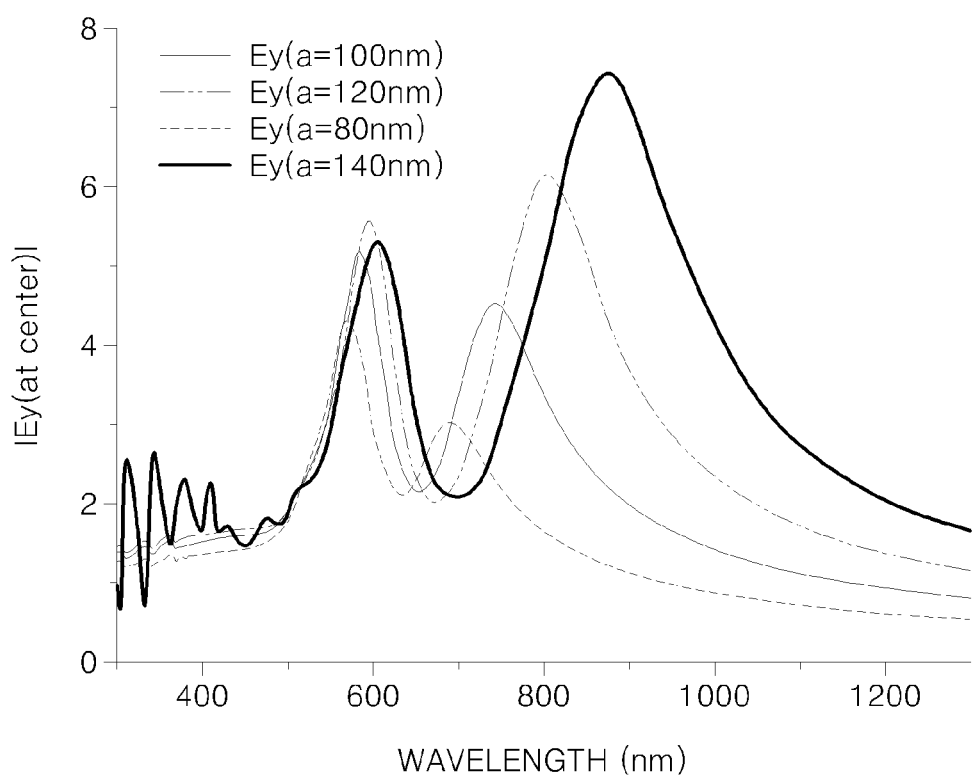
FIG. 5 is a graph illustrating a relationship between a wavelength and an intensity of an electric field when a long width of the nano-structure of FIG. 3 is changed.

FIG. 5 is a graph showing a relationship between a wavelength and an intensity Ey of an electric field when the long width a of the nano-structure 330 is changed. The nano-structure 330 was formed such that the depth h was 100 nm and the short width b was 20 nm, and the long width a of the nano-structure 330 was changed to 80 nm, 100 nm, 120 nm, and 140 nm. Referring to FIG. 5, as the long width a of the nano-structure 330 decreases, a resonance peak located in a right portion of the graph moves toward a short wavelength, and a resonance peak located in a left portion of the graph moves toward a short wavelength.

A wavelength of emitted light may be adjusted by changing a size of the nano-structure 330 including the light source 331 as described above.

Next, an operation of an optical device including a first nano-structure including a light source, and a second nano-structure disposed to be spaced apart from the first nano-structure will be explained.

Figure 6:
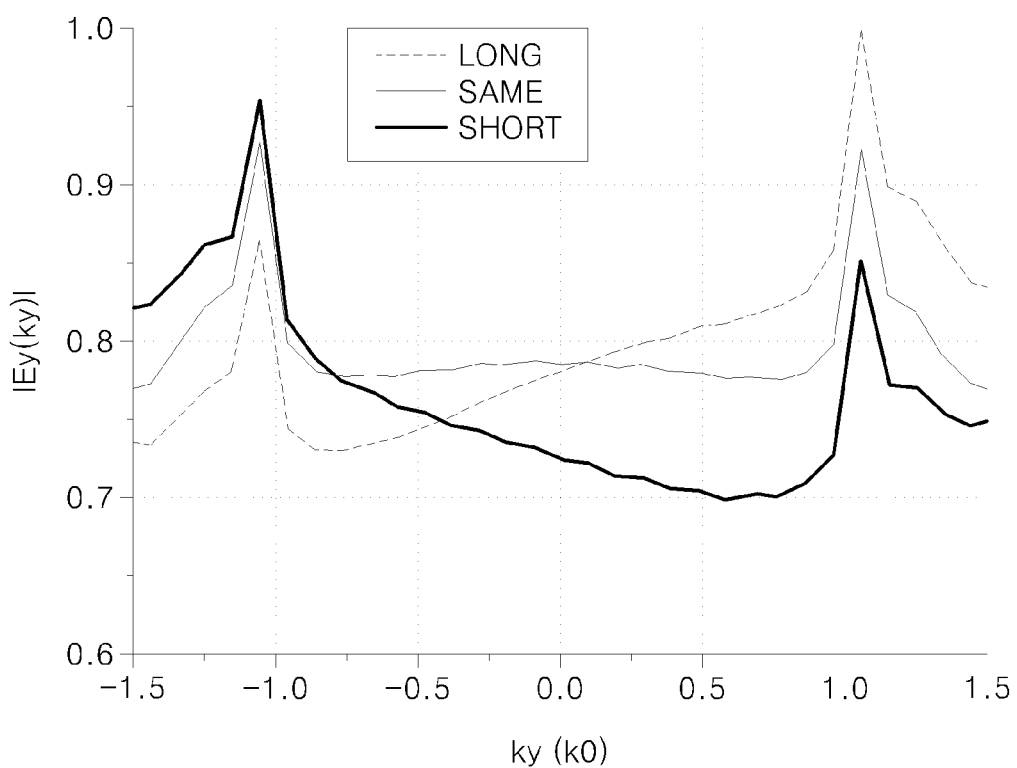
FIG. 6 is a graph illustrating a relationship between a propagation direction of light output from a light source and an intensity of an electric field when long widths of a first nano-structure and a second nano-structure of the optical device of FIG. 1 are changed.

FIG. 6 is a graph showing a relationship between a propagation direction ky of light output from the light source 131 and an intensity Ey of an electric field when the interval s between the first nano-structure 130 and the second nano-structure 135 and a size of the first nano-structure 130 are maintained constant, and the long width a2 of the second nano-structure 135 is changed.

Figure 7A:
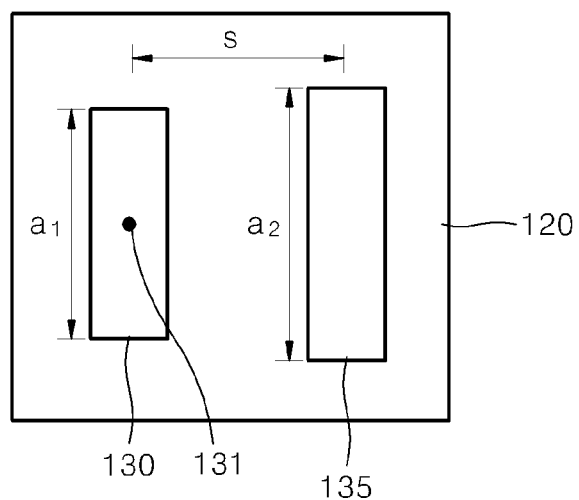
FIGS. 7A and 7B are plan views illustrating examples where sizes of the first nano-structure and the second nano-structure of the optical device of FIG. 1 are changed.
Figure 7B:
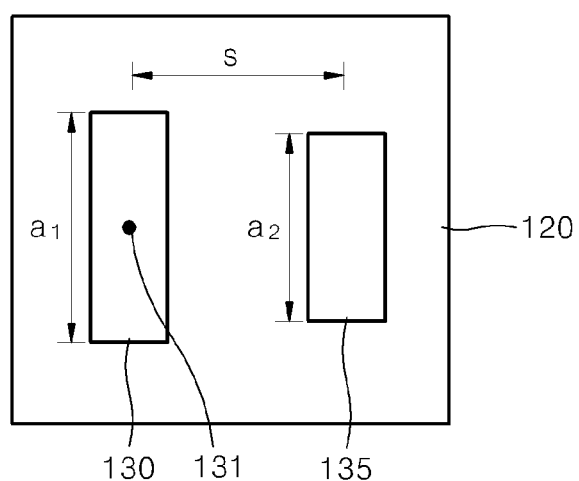

FIGS. 7A and 7B are plan views illustrating examples where sizes of the first nano-structure and the second nano-structure of the optical device of FIG. 1 are changed. Referring to FIG. 7A, the propagation direction ky of light output from the light source 131 may be a direction horizontal to the metal layer 120 and passing through the light source 131. k0 may be a wavevector of light, +ky may indicate a wave propagating in a +y direction, and −ky may indicate a wave propagating in a −y direction. That is, if the propagation direction ky has a positive (+) value, light may propagate in a (+y) direction, and if the propagation direction ky has a negative (−) value, light may propagate in a (−y) direction. ky(k0) indicates that the propagation direction ky is based on the wavevector k0 of incident light. In this case, a wavelength of light output from the light source 131 may be 800 nm, the interval s may be 190 nm, the first long width a1 of the first nano-structure 130 may be 120 nm, the first short width b1 of the first nano-structure 130 may be 20 nm, and the second short width b2 of the second nano-structure 135 may be 20 nm. The substrate 110 may be formed of Al$_2$O$_3$, and the metal layer 120 may be formed of gold (Au). As shown in FIG. 7A, when the second long width a2 of the second nano-structure 135 is greater than the first long width a1 of the first nano-structure 130 (a1<a2), referring to FIG. 6, a line LONG is achieved. In this case, more light may propagate toward the second nano-structure 135 and less light may propagate away from the second nano-structure 135. In this case, the second nano-structure 135 may operate as a director for guiding light output from the light source 131 toward the second nano-structure 135.

As shown in FIG. 7B, when the second long width a2 of the second nano-structure 135 is less than the first long width a1 of the first nano-structure 130 (a1>a2), referring to FIG. 6, a line SHORT is achieved. In this case, more light may propagate away from the second nano-structure 135, and less light may propagate toward the second nano-structure 135. In this case, the second nano-structure 135 may operate as a reflector for reflecting light output from the light source 131 from the second nano-structure 135. The first nano-structure 130 including the light source 131 may operate as a feeder of the optical device 100.

When sizes of the first nano-structure 130 and the second nano-structure 135 are the same, almost the amount of light that propagates to the left side of the first nano-structure 130 and the amount of light that propagates to the right side of the first nano-structure 130 may be the same.

A propagation direction of light may be controlled by changing at least one of the first and second long widths a1 and a2 of the first nano-structure 130 and the second nano-structure 135 as shown in FIGS. 7A and 7B. Alternatively, a propagation direction of light may be controlled by adjusting the interval s between the first nano-structure 130 and the second nano-structure 135. Alternatively, a propagation direction of light may be controlled by changing at least one of the first and second depths h1 and h2 of the first nano-structure 130 and the second nano-structure 135. Alternatively, a propagation direction of light may be controlled by changing at least one of shapes of the first nano-structure 130 and the second nano-structure 135. As such, a propagation direction of light may be controlled by changing at least one of sizes (e.g., long widths, short widths, and depths) of the first nano-structure 130 and the second nano-structure 135, the interval s between the first nano-structure 130 and the second nano-structure 135, and shapes of the first nano-structure 130 and the second nano-structure 135.

Figure 8A:
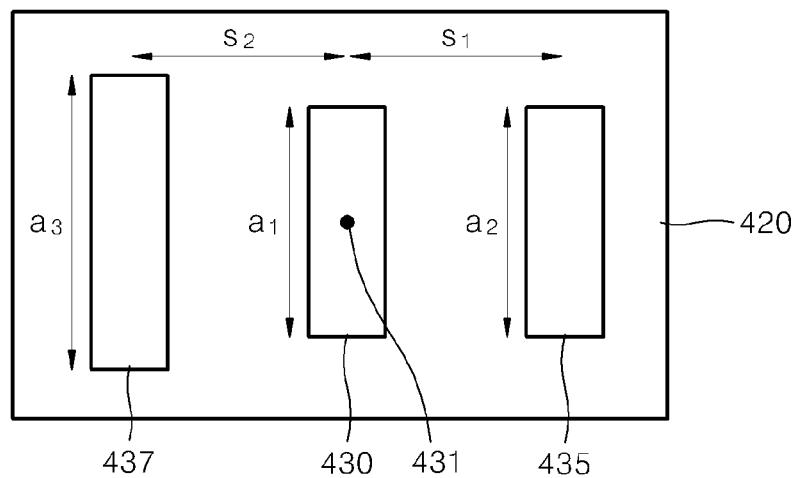
FIGS. 8A through 8C are plan views illustrating examples where sizes of a first nano-structure, a second nano-structure, and a third nano-structure of an optical device are changed.
Figure 8B:
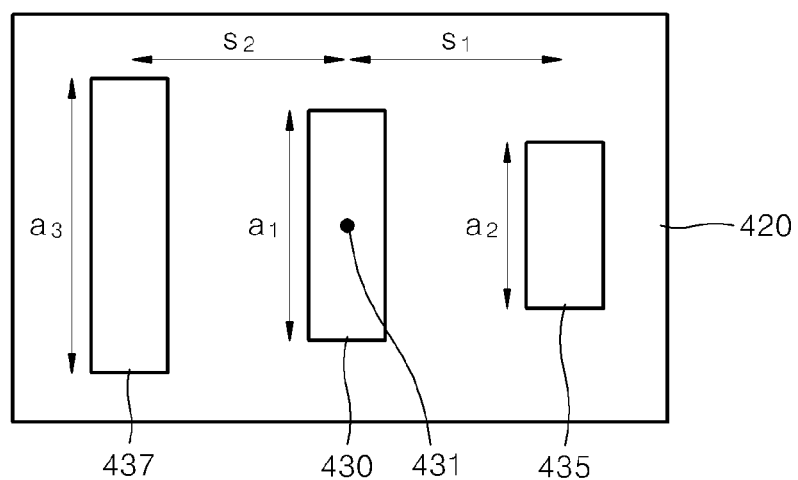
Figure 8C:
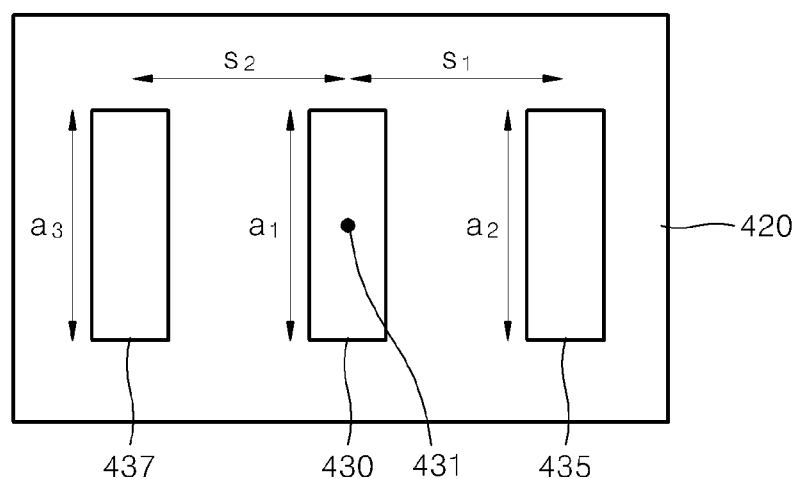
Figure 9:
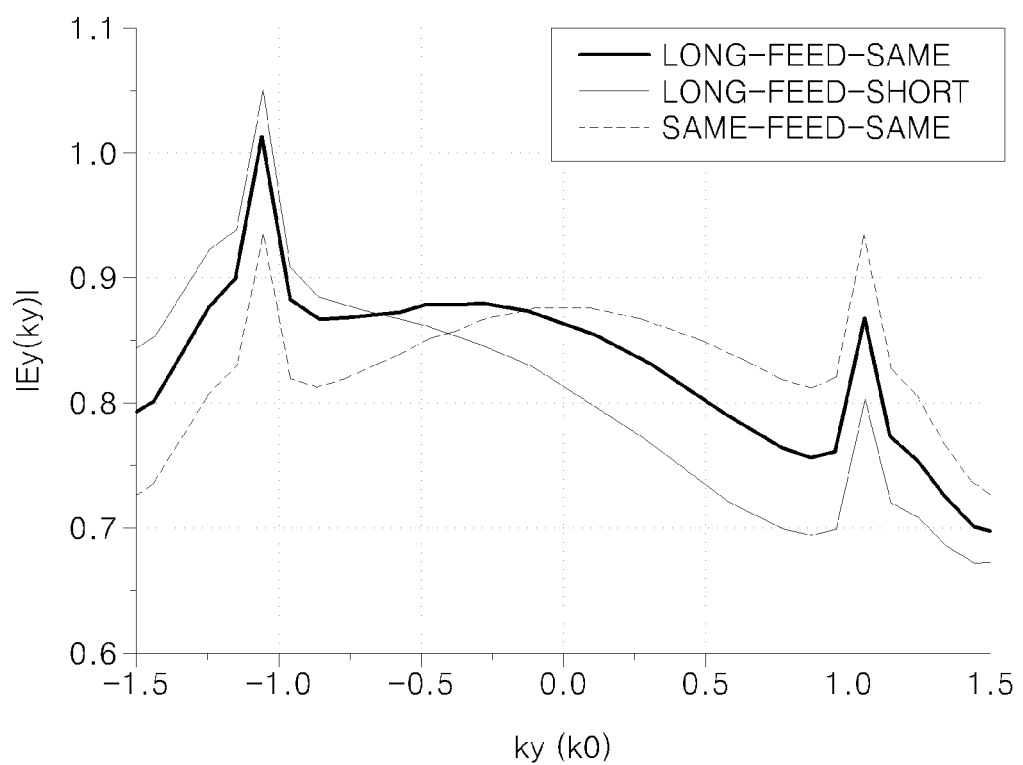
FIG. 9 is a graph illustrating a relationship between a propagation direction of light output from the optical device of FIGS. 8A through 8C and an intensity of an electric field when long widths of a first nano-structure, a second nano-structure, and a third nano-structure of the optical device are changed.

FIGS. 8A through 8C show an example in which sizes of a first nano-structure 430, a second nano-structure 435, and a third nano-structure 437 of an optical device are changed. A light source 431 is included in the first nano-structure 430, and the first nano-structure 430, the second nano-structure 435, and the third nano-structure 437 may be carved into a metal layer 420. An interval s1 between the first nano-structure 430 and the second nano-structure 435 and an interval s2 between the first nano-structure 430 and the third nano-structure 437 may be the same. For example, both the intervals s1 and s2 may be 190 nm (s1=s2=190 nm). In FIG. 8A, a long width a1 of the first nano-structure 430 and a long width a2 of the second nano-structure 435 are the same, and a long width a3 of the third nano-structure 437 is greater than the long width a1 (=a2). For example, a1=a2=120 nm, and a3=136 nm. FIG. 9 is a graph showing a relationship between a propagation direction ky of light output from the light source 431 and an intensity Ey of an electric field when at least one of the long widths a1, a2, and a3 of the first through third nano-structures 430, 435, and 437 is changed.

As shown in FIG. 8A, when the long width a1 of the first nano-structure 430 and the long width a2 of the second nano-structure 435 are the same and the long width a3 of the third nano-structure 437 is greater than the long width a1 of the first nano-structure 430, referring to FIG. 9, a line LONG-FEED-SAME may be achieved. In this case, more light output from the light source 431 of the first nano-structure 430 may exist at the left side of the first nano-structure 430 than at the right side of the first nano-structure 430. The left side and the right side are the left side and the right side in FIG. 9.

As shown in FIG. 8B, when the long width a2 of the second nano-structure 435 is less than the long width a1 of the first nano-structure 430 and the long width a3 of the third nano-structure 437 is greater than the long width a1 of the first nano-structure 430, referring to FIG. 9, a line LONG-FEED-SHORT may be achieved. In this case, more light output from the light source 431 of the first nano-structure 430 may exist at the left side of the first nano-structure 430 than at the right side of the first nano-structure 430. Also, the light existing at the left side of the first nano-structure 430 in FIG. 8B may be greater than the light existing at the left side of the first nano structure 430 in FIG. 8A indicated by the line LONG-FEED-SAME. The second nano-structure 435 may operate as a reflector, and the third nano-structure 437 may operate as a director.

As shown in FIG. 8C, when the long width a1 of the first nano-structure 430, the long width a2 of the second nano-structure 435, and the long width a3 of the third nano-structure 437 are the same, referring to FIG. 9, a line SAME-FEED-SAME is achieved. In this case, almost the amount of light output from the light source 431 of the first nano-structure 430 that exists on the left side of the first nano-structure 430 and the amount of light output from the light source 431 of the first nano-structure 430 that exists on the right side of the first nano-structure 430.

Referring to FIG. 9, a propagation direction of light may be controlled by changing at least one of the long widths a1, a2, and a3 of the first nano-structure 430, the second nano-structure 435, and the third nano-structure 437 as shown in FIGS. 8A, 8B, and 8C. Alternatively, a propagation direction of light may be controlled by adjusting at least one of the interval s1 between the first nano-structure 430 and the second nano-structure 435 and the interval s2 between the first nano-structure 430 and the third nano-structure 437. Alternatively, a propagation direction of light may be controlled by changing at least one of depths of the first nano-structure 430, the second nano-structure 435, and the third nano-structure 437. Alternatively, a propagation direction of light may be controlled by changing at least one of shapes of the first nano-structure 430, the second nano-structure 435, and the third nano-structure 437. As such, a propagation direction of light may be controlled by changing at least one of sizes (e.g., long widths, short widths, and depths) of the first nano-structure 430, the second nano-structure 435, and the third nano-structure 437, the interval s1 between the first nano-structure 430 and the second nano-structure 435, the interval s2 between the first nano-structure 430 and the third nano-structure 437, and shapes of the first through third nano-structures 430, 435, and 437.

Meanwhile, although a method of controlling a propagation direction of light by using three nano-structures has been explained with reference to FIGS. 8A through 8C, a propagation direction of light may be controlled by using four or more nano-structures.

Next, a method of controlling a propagation direction of light output from the optical device 100 of FIG. 1 will be explained.

The metal layer 120 may be disposed on the substrate 110, and the first nano-structure 130 and the second nano-structure 135 may be disposed in the metal layer 120 to be spaced apart from each other. At least one light source 131 may be included in the first nano-structure 130. A propagation direction of light output from the light source 131 may be controlled by changing at least one of sizes of the first nano-structure 130 and the second nano-structure 135, shapes of the first nano-structure 130 and the second nano-structure 135, and the interval s between the first nano-structure 130 and the second nano-structure 135.

For example, the first nano-structure 130 may have a slot shape, and a wavelength of light output from the light source 131 may be adjusted by changing at least one of a depth and a width of the slot shape.

For example, the first nano-structure 130 may be formed to have a hexahedral slot shape having the first depth h1, the first long width a1, and the first short width b1. The second nano-structure 135 may be formed to have a hexahedral slot shape having the second depth h2, the second long width a2, and the second short width b2. In this case, a propagation direction of light output from the light source 131 may be controlled by changing at least one of the interval s between the first nano-structure 130 and the second nano-structure 135, the first depth h1, the first long width a1, the first short width b1, the second depth h2, the second long width a2, and the second short width b2.

For example, a propagation direction of light may be controlled by maintaining constant the interval s between the first nano-structure 130 and the second nano-structure 135, the first depth h1, the second depth h2, the first short width b1, and the second short width b2 and by changing at least one of the first long width a1 and the second long width a2.

Alternatively, a propagation direction of light may be controlled by changing the interval s between the first nano-structure 130 and the second nano-structure 135 when the first depth h1 and the second depth h2 are the same, the first long width a1 and the second long width a2 are the same, and the first short width b1 and the second short width b2 are the same.

Meanwhile, although a method of controlling a propagation direction of light by using two nano-structures has been described above, a propagation direction of light may be controlled by using three nano-structures. As shown in FIG. 2, the second nano-structure 235 may be disposed at a side of the first nano-structure 230 to be spaced apart from the first nano-structure 230, and the third nano-structure 237 may be disposed at another side of the first nano-structure 230 to be spaced apart from the first nano-structure 230. The first nano-structure 230 may have a hexahedral slot shape having the first depth h1, the first long width a1, and the first short width b1. The second nano-structure 235 may have a hexahedral slot shape having the second depth h2, the second long width a2, and the second short width b2. The third nano-structure 237 may have a hexahedral slot shape having the third depth h3, the third long width a3, and the third short width b3.

A propagation direction of light output from the light source 231 may be controlled by changing at least one of sizes of the first nano-structure 230, the second nano-structure 235, and the third nano-structure 237, shapes of the first nano-structure 230, the second nano-structure 235, and the third nano-structure 237, the interval s1 between the first nano-structure 230 and the second nano-structure 235, and the interval s2 between the first nano-structure 230 and the third nano-structure 237. The sizes of the first through third nano-structures 230, 235, and 237 may be adjusted by changing at least one of, for example, depths, long widths, and short widths.

Referring to FIG. 2, a propagation direction of light may be controlled by changing at least one of the interval s1 between the first nano-structure 230 and the second nano-structure 235, the interval s2 between the first nano-structure 230 and the third nano-structure 237, the first depth h1, the first long width a1, the first short width b1, the second depth h2, the second long width a2, the second short width b2, the third depth h3, the third long width a3, and the third short width b3.

For example, a propagation direction of light may be controlled by changing the first long width a1, the second long width a2, and the third long width a3 when the interval s1 between the first nano-structure 230 and the second nano-structure 235 and the interval s2 between the first nano-structure 230 and the third nano-structure 237 are the same, the first depth h1, the second depth h2, and the third depth h3 are the same, and the first short width b1, the second short width b2, and the third short width b3 are the same.

Also, a surface plasmon may be generated on the metal layer 220 in which the first through third nano-structures 230, 235, and 237 are formed. Accordingly, a method of controlling a propagation direction of light may transmit light output from the light source 231, and may transmit a surface plasmon generated on the metal layer 220. The method of controlling the propagation direction of light may control a propagation direction of the light output from the light source 231 and/or a surface plasmon.

Optical device 200 may further comprise a fourth nano-structure in metal layer 220 and/or a fifth nano-structure in metal layer 220. The fourth nano-structure may be spaced apart from the first nano-structure 230, second nano-structure 235, and third nano-structure 237. The fifth nano-structure may be spaced apart from the first nano-structure 230, second nano-structure 235, third nano-structure 237, and fourth nano-structure. The fourth nano-structure may be disposed at a side of the second nano-structure 235 opposite to the first nano-structure 230. The fifth nano-structure may be disposed at a side of the third nano-structure 237 opposite to the first nano-structure 230.

While example embodiments have been particularly shown and described, it will be understood by those of ordinary skill in the art that various changes in form and details may be made therein without departing from the spirit and scope of the present invention as defined by the following claims.

What is claimed is:

1. An optical device, comprising:
a substrate;
a metal layer on the substrate;
at least one first nano-structure in the metal layer; and
at least one second nano-structure in the metal layer;
wherein the at least one first nano-structure includes a light source,
wherein the at least one second nano-structure is spaced apart from the at least one first nano-structure,
wherein each of the at least one first nano-structure and the at least one second nano-structure has a transverse cross-section comprising a relatively longer width and a relatively shorter width, and
wherein the at least one second nano-structure is configured to change a propagation direction of light output from at least one source of light in the light source.

2. The optical device of claim 1, wherein the at least one first nano-structure is carved into the metal layer.

3. The optical device of claim 1, wherein the at least one second nano-structure is carved into the metal layer.

4. The optical device of claim 1, wherein the at least one first nano-structure has a hexahedral shape.

5. The optical device of claim 1, wherein the at least one second nano-structure has a hexahedral shape.

6. The optical device of claim 1, wherein the optical device is an optical antenna.

7. The optical device of claim 1, wherein the at least one first nano-structure has a hexahedral shape having a depth, a short width, and a long width, and
wherein a resonance wavelength of the light source is adjusted by changing at least one of the depth, the short width, and the long width.

8. The optical device of claim 1, wherein the at least one first nano-structure has a hexahedral shape having a first depth, a first short width, and a first long width, and
wherein the propagation direction of the light output from the light source is adjusted by changing at least one of an interval between the at least one first nano-structure and the at least one second nano-structure, and the first long width.

9. The optical device of claim 1, wherein the at least one second nano-structure has a hexahedral shape having a first depth, a first short width, and a first long width, and
wherein the propagation direction of the light output from the light source is adjusted by changing at least one of an interval between the at least one first nano-structure and the at least one second nano-structure, and the first long width.

10. The optical device of claim 1, wherein the at least one first nano-structure has a hexahedral shape having a first depth, a first short width, and a first long width,
wherein the at least one second nano-structure has a hexahedral shape having a second depth, a second short width, and a second long width, and
wherein the propagation direction of the light output from the light source is adjusted by changing at least one of an interval between the at least one first nano-structure and the at least one second nano-structure, the first long width, and the second long width.

11. The optical device of claim 1, wherein the at least one first nano-structure has a slot shape.

12. The optical device of claim 1, wherein the at least one second nano-structure has a slot shape.

13. The optical device of claim 1, wherein the light source comprises at least one of a point light source, a line light source, and a surface light source.

14. The optical device of claim 1, wherein the light source comprises at least one of quantum dots, dye molecules, and a laser.

15. The optical device of claim 1, wherein a surface plasmon is generated on the metal layer.

16. The optical device of claim 1, wherein the at least one first nano-structure has a size less than a wavelength of the light output from the light source.

17. The optical device of claim 1, wherein the at least one second nano-structure has a size less than a wavelength of the light output from the light source.

18. An optical device, comprising:
a substrate;
a metal layer on the substrate;
a first nano-structure in the metal layer; and
a second nano-structure in the metal layer;
wherein the first nano-structure includes a light source,
wherein the second nano-structure is spaced apart from the first nano-structure, wherein the first nano-structure has a hexahedral shape having a first depth, a first short width, and a first long width, wherein the second nano-structure has a hexahedral shape having a second depth, a second short width, and a second long width, and wherein the second nano-structure is configured to change a propagation direction of light output from at least one source of light in the light source.

19. The optical device of claim 18, wherein the first depth and the second depth are the same, and wherein the second long width is less than the first long width.

20. The optical device of claim 18, wherein when the second long width is greater than the first long width, light output from the light source propagates toward the second nano-structure.

21. The optical device of claim 18, wherein when the second long width is less than the first long width, light output from the light source propagates away from the second nano-structure.

22. The optical device of claim 18, further comprising:
a third nano-structure in the metal layer;
wherein the third nano-structure is spaced apart from the first and second nano-structures, and
wherein the third nano-structure is disposed at a side of the first nano-structure opposite to the second nano-structure.

23. The optical device of claim 22, wherein the third nano-structure has a hexahedral shape having a third depth, a third short width, and a third long width.

24. The optical device of claim 23, wherein an interval between the first nano-structure and the second nano-structure and an interval between the first nano-structure and the third nano-structure are the same,
wherein the first long width and the second long width are the same, and
wherein the third long width is greater than the first long width.

25. The optical device of claim 23, wherein an interval between the first nano-structure and the second nano-structure and an interval between the first nano-structure and the third nano-structure are the same,
wherein the second long width is less than the first long width,
wherein the third long width is greater than the first long width, and
wherein the third long width is greater than the second long width.

26. The optical device of claim 23, wherein an interval between the first nano-structure and the second nano-structure and an interval between the first nano-structure and the third nano-structure are the same, and
wherein the first long width, the second long width, and the third long width are the same.

27. The optical device of claim 23, wherein each of the first depth, the second depth, the third depth, the first short width, the second short width, the third short width, the first long width, the second long width, and the third long width is less than a wavelength of light output from the light source.

28. The optical device of claim 22, further comprising:
a fourth nano-structure in the metal layer; and
a fifth nano-structure in the metal layer;
wherein the fourth nano-structure is spaced apart from the first, second, and third nano-structures, and wherein the fifth nano-structure is spaced apart from the first, second, third, and fourth nano-structures.

29. The optical device of claim 28, wherein the fourth nano-structure is disposed at a side of the second nano-structure opposite to the first nano-structure.

30. The optical device of claim 28, wherein the fifth nano-structure is disposed at a side of the third nano-structure opposite to the first nano-structure.

31. The optical device of claim 18, wherein the first nano-structure has a slot shape.

32. The optical device of claim 18, wherein the second nano-structure has a slot shape.

33. The optical device of claim 18, wherein a surface plasmon is generated on the metal layer.

34. A method of controlling a propagation direction of light output from an optical device comprising a metal layer on a substrate, the method comprising:
disposing a first nano-structure and a second nano-structure in the metal layer, spaced apart from each other;
disposing at least one light source in the first nano-structure; and
controlling the propagation direction of the light output from the at least one light source by changing at least one of a shape of the first nano-structure, a shape of the second nano-structure, a size of the first nano-structure, a size of the second nano-structure, and an interval between the first nano-structure and the second nano-structure.

35. The method of claim 34, wherein the first nano-structure has a slot shape, and
wherein a wavelength of the light output from the at least one light source is adjusted by changing at least one of a depth and a width of the slot shape.

36. The method of claim 34, wherein when the first nano-structure has a hexahedral shape having a first depth, a first short width, and a first long width, and the second nano-structure has a hexahedral shape having a second depth, a second short width, and a second long width, controlling the propagation direction of the light output from the at least one light source comprises:
changing at least one of the interval between the first nano-structure and the second nano-structure, the first depth, the first short width, the first long width, the second depth, the second short width, and the second long width.

37. The method of claim 34, wherein when the first nano-structure has a hexahedral shape having a first depth, a first short width, and a first long width, and the second nano-structure has a hexahedral shape having a second depth, a second short width, and a second long width, controlling the propagation direction of the light output from the at least one light source comprises:
changing at least one of the first long width and the second long width.

38. The method of claim 34, wherein when the first nano-structure has a hexahedral shape having a first depth, a first short width, and a first long width, and the second nano-structure has a hexahedral shape having a second depth, a second short width, and a second long width, controlling the propagation direction of the light output from the at least one light source comprises:
maintaining constant the interval between the first nano-structure and the second nano-structure, the first depth, the first short width, the second depth, an the second short width; and
changing at least one of the first long width and the second long width.

39. The method of claim 34, wherein when the first nano-structure has a hexahedral shape having a first depth, a first short width, and a first long width, and the second nano-structure has a hexahedral shape having a second depth, a second short width, and a second long width, controlling the propagation direction of the light output from the at least one light source comprises:
changing the interval between the first nano-structure and the second nano-structure.

40. The method of claim 34, wherein when the first nano-structure has a hexahedral shape having a first depth, a first short width, and a first long width, and the second nano-structure has a hexahedral shape having a second depth, a second short width, and a second long width, controlling the propagation direction of the light output from the at least one light source comprises:
maintaining constant the first depth, the first short width, the first long width, the second depth, the second short width, and the second long width; and
changing the interval between the first nano-structure and the second nano-structure.

41. The method of claim 34, further comprising:
disposing a third nano-structure in the metal layer;
wherein the third nano-structure is spaced apart from the first and second nano-structures,
wherein the third nano-structure is disposed at a side of the first nano-structure opposite to the second nano-structure,
wherein the first nano-structure has a hexahedral shape having a first depth, a first short width, and a first long width,
wherein the second nano-structure has a hexahedral shape having a second depth, a second short width, and a second long width, and
wherein the third nano-structure has a hexahedral shape having a third depth, a third short width, and a third long width.

42. The method of claim 41, wherein controlling the propagation direction of the light output from the at least one light source comprises changing at least one of the interval between the first nano-structure and the second nano-structure, an interval between the first nano-structure and the third nano-structure, the first depth, the first short width, the first long width, the second depth, the second short width, the second long width, the third depth, the third short width, and the third long width.

43. The method of claim 41, wherein controlling the propagation direction of the light output from the at least one light source comprises, when the interval between the first nano-structure and the second nano-structure and an interval between the first nano-structure and the third nano-structure are the same, the first depth, the second depth, and the third depth are the same, and the first short width, the second short width, and the third short width are the same, changing at least one of the first long width, the second long width, and the third long width.

44. The method of claim 34, wherein a surface plasmon is generated on the metal layer, and
wherein a propagation direction of the surface plasmon is controlled by using the first nano-structure and the second nano-structure.

45. The method of claim 34, wherein the at least one light source comprises at least one of quantum dots, dye molecules, and a laser.

* * * * *